United States Patent Office 2,822,322
Patented Feb. 4, 1958

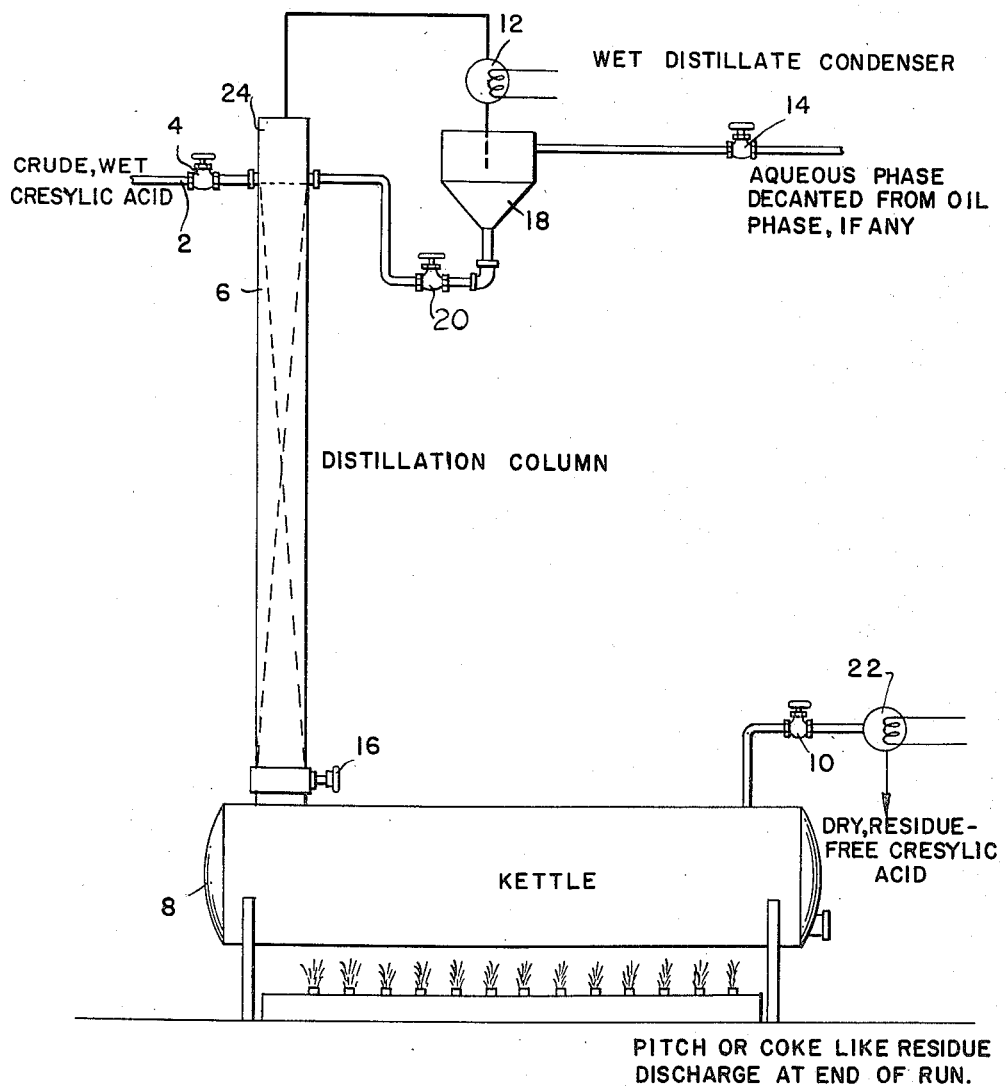

2,822,322

DISTILLABLE CRUDE PRODUCTS

Robert D. Rice, Pittsburgh, Pa., assignor to Pittsburgh Coke & Chemical Company, Pittsburgh, Pa., a corporation of Pennsylvania Application September 9, 1955, Serial No. 533,411

13 Claims. (Cl. 202—70)

The present invention relates to an improved process for the recovery of the phenolic constituents of crude wet cresylic acid.

Crude cresylic acid, whether of coke, gas plant or other origin, contains phenol, the isomeric cresols (ortho, meta and para), the isomeric xylenols (e. g., 2,4-dimethyl phenol and 2,6-dimethyl phenol) and higher boiling phenolic compounds, e. g., trimethyl phenols and tetramethyl phenols contaminated with myriad other organic compounds, including the analogous thiophenols, mercaptans, naphthalene and other neutral oils, a small amount of tar bases, e. g., pyridine, etc. In addition, water is present to the extent of 10 to 40%, and numerous inorganic compounds, either arising from the method of separating the tar acids or occurring in the tar distillates, are also present. These inorganic compounds, generally, include sodium, ammonium and other cations and carbonate, bicarbonate, cyanide, thiocyanate and other anions, as is well recognized in the art.

In the most common practice for treating the crude cresylic acid, it is subjected to a fractional distillation in which there are removed successively distillates of (1) water, principally as the azeotrope of phenol and water, (2) phenol in one or more grades of purity, (3) ortho cresol, (4) a mixture of meta and para cresols, and (5) xylenols in one or more fractions. It has also been proposed to remove part of the water by a simple distillation prior to the fractionation. This method, however, suffers from the disadvantage that it cannot be carried to completion without serious loss of phenols, unless special and elaborate fractionating equipment is employed.

The successive removal of the above distillates has been accomplished in the past either in a batchwise fractionation, or as overhead products from several towers in continuous fashion. In the case of batch-wise distillation, the presence of even as little as 1% of water gives rise to operating difficulties, as a result of its extremely great volatility relative to the phenols present, its widely different thermodynamic properties in respect to the phenols, as well as in other ways. The residues also cause trouble throughout either batch or continuous distillation in various ways. Thus, the residues lower the volatility of the charge or stream, they deposit on coils and plates and they decompose gradually throughout the process, giving rise to materials, such as hydrogen sulfide, carbon dioxide, water and others, which tend to contaminate the desired phenolic products and to cause corrosion of the equipment employed.

Accordingly, it is an object of the present invention to purify cresylic acid in a manner which avoids the disadvantages of the above mentioned processes.

A further object of the invention is to separate the more volatile phenolic components of crude cresylic acid from the residue in such a manner as to avoid contamination of the more volatile phenolic components with decomposition products of the residues.

An additional object of the present invention is to prepare a cresylic acid fraction free of water and high boiling impurities and from which the desired phenols or phenol fractions can be recovered with greater ease and economy.

Another object of the present invention is to prepare a cresylic acid fraction from which specific phenols or phenol fractions of better quality can be separated than could be accomplished by prior art processes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the accomplishment of these objects can be attained by subjecting the crude, wet cresylic acid to a semi-continuous distillation process which removes essentially all of the water content, while, simultaneously, subjecting the tar acids in the cresylic acid to a simple distillation. This procedure, in addition to removal of the water, leaves behind inorganic and nonvolatile organic residues which would, otherwise, interfere with the separation of pure phenolic products, and also causes thermal decomposition of certain impurities at this stage rather than in the subsequent pure distillation. Hence, contamination of the valuable individual phenols or specific phenol fractions with such decomposition products is avoided.

The present process, thus, is primarily directed to a preliminary distillation step for the purpose of preparing a cresylic acid fraction which is free of water and is also free of high or non-boiling impurities.

The single figure of the accompanying drawing shows diagrammatically an illustrative apparatus suitable for carrying out the present invention, although it will be appreciated that modifications thereof can be made without deviating from the present invention.

Referring now to the drawing, crude, wet cresylic acid is conducted by line 2 through feed valve 4 to a point near the top of distillation column 6 from where it falls into kettle 8. Alternatively, this initial charge of crude, wet cresylic acid can be added directly to the kettle 8 by removal of the closure (not shown) of a suitable opening therein. The kettle is heated to boiling by any suitable heating means, such as direct fire (gas, oil, coal, etc.), or steam, etc., and feed valve 4 and product valve 10 are closed. Heating is normally carried out at atmospheric pressure, but the process may be operated under vacuum, e. g., 50 mm. pressure. The overhead distillate, after partial reflux is established, is water or the lowest boiling azeotrope containing water and is condensed in wet distillate condenser 12 and then removed through valve 14.

Preferably, the wet distillate, after leaving the condenser 12, flows into decanter 18. In the decanter, a relatively large upper aqueous layer and a smaller oil lower layer will usually form. As previously mentioned, the aqueous layer is continually removed through valve 14. The lower oil layer is continuously or preferably intermittently returned to the distillation column 6 through valve 20. Decanter 18 and valve 20 can be omitted in those processes where a two-phase distillate, e. g., an aqueous phase and an organic phase, is not formed. Partial reflux is continued until the kettle charge is substantially dry. This condition can be indicated by test, e. g., less than 0.2% water in the kettle contents, or by a rise in temperature at the top of distillation column 6. At this time, continuous operation is begun by introducing crude, wet cresylic acid feed through valve 4 at a controlled rate, determined by design and operating conditions, and flows down the distillation column 6, wherein it is stripped of water by the rising vapors from kettle 8. The rate of feed should be so related to the design of the distillation column that all of the water is stripped from the feed prior to the feed entering kettle 8. The rate of feed is also preferably adjusted so that take-off of the water-rich rising vapors is continued at a rate just equal to its rate of accumulation. If the take-off of the water-rich product is at a slower rate than its accumulation, water will eventually begin to appear in the kettle, which is undesirable, whereas, if the take-off is at a faster rate than its accumulation, then an undesirably large amount of phenolic vapors will be removed with the water and will have to be will have to be recycled. This latter action decreases the efficiency of the process somewhat although permitting a somewhat faster operation. The water-rich material is returned elsewhere in the tar acid process or handled in any conventional manner to recover its phenolic constituents.

When feeding of crude, wet cresylic acid is started, after the kettle contents are substantially anhydrous, take-off of the phenolic product is also commenced through valve 10, preferably at a rate just sufficient to maintain the volume in the kettle approximately constant. This rate can be maintained, for example, by adjusting valve 10. If the kettle contents are allowed to either continually increase or decrease, the length of time during which the operation is continued will be materially shortened.

The process described above is continued until the high boiling and non-boiling residues accumulate in the kettle to such an extent as to interfere with the efficient operation of the process or to be deemed limiting for other reasons. At this point, feed is stopped, the last water is taken off, and then valve 14 is closed and the distillation column 6 plays no further part in the operation of the process. If desired, column 6 can be isolated from the kettle 8 by operation of suitable means, such as valve 16.

Removal of the product through valve 10 is continued until all the desired distillates have been recovered in the form of dry residue-free cresylic acid after passing through condenser 22. The dry residue-free cresylic acid can then be fractionated in conventional manner.

Removal of product through valve 10 can even be carried to the point where the residue chars, or it can be interrupted sooner, if desired. The last portion of the dry distillate is frequently contaminated with degradation products and, hence, it is preferably kept separate for another passing through the operation or for other treatment. However, it can be included with the rest of the dry distillate, although this is less preferable.

Distillation column 6 can have a rectifying section 24 above the feed point. This is a preferred method of operation, particularly, in the case of lower water content, i. e., about 10% or less in the cresylic acid.

In the specification and claims, all percentages are by weight, unless otherwise specified.

Example

A two liter flask fitted with a valved condenser, a thermometer, and a column 12 inches high by one inch in diameter, packed with a small metal packing and equipped with a reflux head, thermometer, and condenser, was used. The large scale column can be equipped with bubble cap trays, or packed with Raschig rings or any other conventional packing. A typical crude cresylic acid, in an amount of 1200 cc. and containing about 20% water and having a very dark-brown color, was charged to the flask, and dehydrated batch-wise. 278 cc. of a cloudy distillate, containing a few cc. of heavy oil phase, was obtained. This latter, and all oil phases subsequently obtained, were returned to the column periodically.

Feeding to the top of the column was then begun at a rate of 4 to 5 cc. per minute, and simultaneously a cloudy water phase was taken off the top of the column, so as to keep the vapor temperature at that point between 99 and 100° C., and the product was taken off through the valved condenser at a rate which kept the volume in the flask at about 100 cc. It was found that the water phase could be taken off faster, allowing the column head temperature to rise to 110° C., or higher, with no effect, except that there was more oil layer to be decanted and recycled. There is no upper limit to the temperature, but, normally, there is no advantage in exceeding 110° C., as the excess heat is merely wasted.

The temperature of the liquid in the kettle gradually rose to 206° C., at which point the feed was cut off and the column was placed on total reflux. Take-off of product was continued through the valved condenser until the residue was partly charred to a soft coke.

A total of 5753 cc. were fed, including the initial charge.

1366 cc. of aqueous distillate, cloudy, but containing very little dissolved organic matter, was collected.

4059 cc. of substantially dry distilled cresylic acid was recovered, and 378 grams of residue remained in the flask.

The distilled cresylic acid varied in color and content progressively throughout the run, all samples, but the very last, being pale pink or yellow. The samples had increasingly strong odors of sulfur compounds. Moisture content of successive samples varied from 0.1 to 0.2%, except for the last few small fractions which gave evidence of water from decomposition during coking.

The combined substantially dry cresylic acid distillates were fractionally distilled under vacuum, 100 mm. mercury absolute pressure yielding approximately:

0.4% wet forerun
45% phenol, M. P. 39.5° C.
10% phenol, M. P. 35° C.
12% intermediate, including ortho cresol
25% meta and para cresols mixed
5.3% xylenols 205° C. to 230° C.
0.7% residue and drainings, fluid at room temp.
1.6% holdup and loss by difference.

The distribution of the various phenols in the substantially dry cresylic acid distillate will depend upon the composition of the original crude cresylic acid and also, to some extent, on the efficiency of the column used. Cuts of phenols recovered by a similar distillation from the crude itself are inferior in odor and color stability, in comparison to cuts obtained when employing the process of the present invention.

The process of the present invention has the further advantage that fractionation of the cresylic acid is facilitated by the fact that an equal volume charge of the predistilled cresylic acid contains more of each valuable constituent and less impurities than is the case with a simple distillation. A further advantage of the present process is that, when using steam-heated plant equipment, the distillation can be carried to a further degree of completion without forming a semi-solid residue from many crudes than is the case when using the old simple distillation.

While the present invention is of particular value in dehydrating wet cresylic acid, and this is the preferred mode of operation, it can also be used effectively in removing water or other low boiling impurities, and low-volatile or non-volatile residues from other distillable products. Specific examples of other crude products to which the present invention is applicable and from which water can be removed are crude tar bases, e. g., coke oven recovery tar bases, having a boiling point range of 90° to 200° C. and containing pyridine, α-, β-, and gamma-picoline, lutidine, aniline, quinoline, etc., contaminated with water and inorganic salts. The invention can also be used in the improvement of neutral aromatic oils within a boiling point range of 80° to 300° C., and containing benzene, toluene, xylenes, naphthalene, tar acids and bases, anthracene and the like, contaminated with water, inorganic compounds and polymeric materials. The crude material can be of petroleum, gas, or coal origin.

I claim:

1. A process comprising substantially completely dehydrating a batch of crude, wet cresylic acid in a vessel by distillation, continuously adding further crude, wet cresylic acid to said batch in such a manner that it is substantially dehydrated by vapors rising from a first portion of said vessel prior to reaching said vessel and simultaneously continuously subjecting the anhydrous cresylic acid to a separate distillation and removing said separately distilled anhydrous cresylic acid from a second portion of said vessel.

2. The process of claim 1, wherein the addition of crude, wet cresylic acid is stopped prior to the stopping of the distillation of the anhydrous cresylic acid and the latter is stopped prior to complete charring of the residue in the vessel.

3. A process comprising introducing crude, wet cresylic acid into a vessel, stopping the introduction of the crude wet cresylic acid, then distilling the contents of the vessel through a first distillation portion of said vessel until the contents of the vessel are substantially anhydrous, thereafter continuing the distillation while introducing more crude wet cresylic acid into the first distillation portion of said vessel at such a rate that substantially all the water is removed from the crude wet cresylic acid by the time the cresylic acid reaches said vessel by rising vapors from said vessel to form a water-rich distillate and continuously distilling the anhydrous contents of said vessel in a second distillation portion of said vessel in order to recover anhydrous cresylic acid.

4. The process of claim 3, wherein the distillation in the second distillation portion of said vessel is carried out at such a rate that the contents of the vessel are maintained substantially constant.

5. The process of claim 4, wherein the takeoff of the water-rich rising vapors in the first distillation portion of said vessel is carried out at a rate about equal to its rate of accumulation.

6. The process of claim 3, wherein the introduction of crude, wet cresylic acid is stopped, then the removal of distillate through the first distillation portion of said vessel is stopped after substantially all the water therein is removed, and distillation in the second distillation portion of said vessel is continued for a further period of time to partially deplete the contents of the vessel but is stopped prior to substantial charring of the residue in the vessel.

7. The process of claim 3, wherein the distillation in the second portion of said vessel is carried out at such a rate that the contents of the vessel are maintained substantially constant, the introduction of crude, wet cresylic acid is stopped, then the removal of distillate through the first distillation portion of said vessel is stopped, after substantially all the water therein is removed, and distillation in the second distillation portion of said vessel is continued for a further period of time to partially deplete the contents of the vessel but is stopped prior to substantial charring of the residue in the vessel.

8. The process of claim 7, wherein the aqueous distillate from the first distillation portion of said vessel is separated into an aqueous layer and an oil layer, the aqueous layer is removed and the oil layer is returned to the first distillation portion of said vessel.

9. The process of claim 3, wherein the aqueous distillate from the first distillation portion of said vessel is separated into an aqueous layer and an oil layer, the aqueous layer is removed and the oil layer is returned to the first distillation portion of said vessel.

10. The process of claim 3, wherein the first distillation portion of said vessel includes a rectifying section above the point of introduction of the crude, wet cresylic acid.

11. The process of claim 10, wherein the crude cresylic acid contains not over about 10% water.

12. A process for purifying a batch of a crude mixture in a vessel containing a low-boiling impurity, a higher-boiling distillable product and a relatively low volatile residue comprising substantially completely removing the low-boiling impurity by distillation in a first portion of said vessel, continuously adding further amounts of said crude mixture to said batch in such a manner that the low-boiling impurity is substantially removed by vapors rising from said first portion of said vessel prior to reaching said vessel and simultaneously continuously subjecting the contents of said vessel from which the low-boiling impurity has been removed to a separate distillation in a second portion of said vessel and recovering the higher-boiling distillable product as the distillate from said second distillation.

13. The process according to claim 12, wherein the low-boiling impurity is water and the balance of the crude material comprises higher-boiling organic substances.

References Cited in the file of this patent

UNITED STATES PATENTS

| | | |
|---|---|---|
| 1,252,725 | Sanford et al. | Jan. 8, 1918 |
| 1,559,218 | Barbet | Oct. 27, 1925 |
| 2,663,681 | Hull et al. | Dec. 22, 1953 |